Sept. 5, 1939.                G. A. GILLEN                2,171,979
                           ELECTRICAL MACHINE
                         Filed Sept. 22, 1937
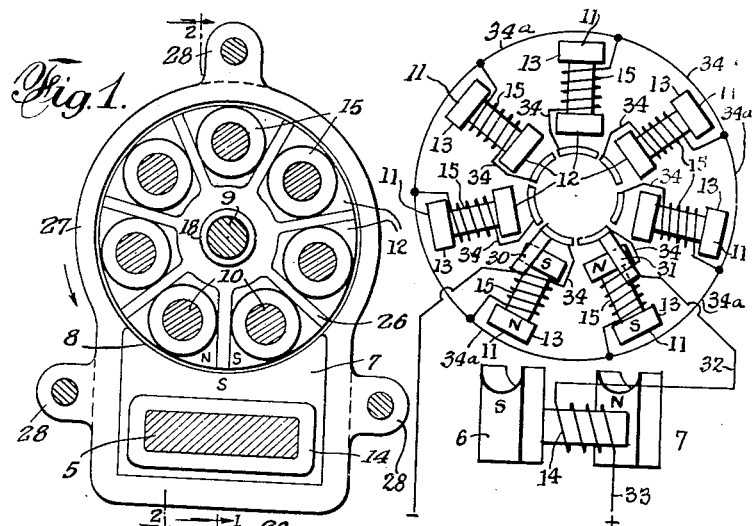
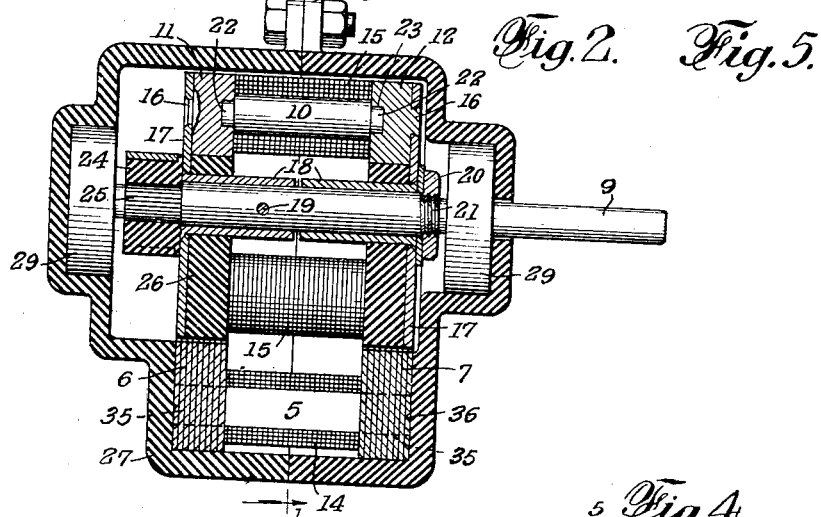
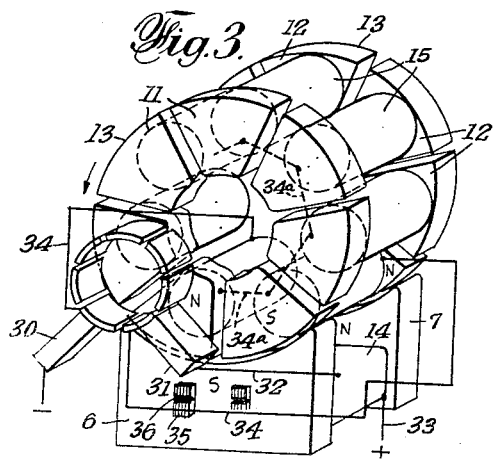
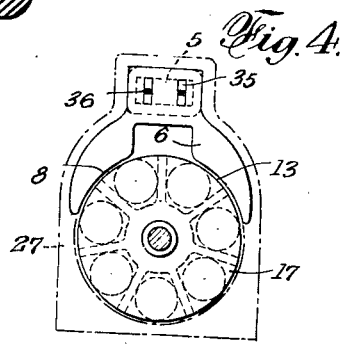
GEORGE A. GILLEN
INVENTOR
BY
ATTORNEY Patented Sept. 5, 1939

2,171,979

UNITED STATES PATENT OFFICE 2,171,979

ELECTRICAL MACHINE

George A. Gillen, Bronx, N. Y.

Application September 22, 1937, Serial No. 165,006

1 Claim. (Cl. 172—36)

The invention here disclosed relates to electrical machines in the nature of motors, generators and the like.

The objects of the invention particularly are to provide a practical and inexpensive form of construction for light, small, low power units; also a construction which can be readily assembled and which for its size and form of construction, will have desirable starting and running torque characteristics.

These and other desirable objects are attained by the novel features of construction, combinations and relations of parts hereinafter described, illustrated in the accompanying drawing and broadly covered in the claim.

The drawing accompanying and forming part of the following specification illustrates certain practical embodiments of the invention. Actual structure however, may be modified and changed in various ways, within the true intent of the invention, as will appear from the scope of the claim.

Fig. 1 is a vertical sectional view of an embodiment of the invention, the same appearing as on the section line 1—1 of Fig. 2.

Fig. 2 is a vertical sectional view at an angle to the first illustration, as on line 2—2 of Fig. 1.

Fig. 3 is a diagrammatic perspective view of the essential elements of the machine.

Fig. 4 is a broken part sectional end view of a modified form of the invention.

Fig. 5 is a wiring diagram.

One of the special features of the invention is the employment of a single field magnet, in the form of a straight magnet core 5, having angularly extending pole pieces 6, 7, at the opposite ends of the same, formed with extended arcuate pole faces 8, substantially concentric to the armature shaft 9.

The armature is made up of straight magnet cores 10, disposed longitudinally of the armature shaft and having angularly related poles 11, 12, of generally segmental form having convex peripheral faces 13, directly opposed to and concentric with the field poles.

A single energizing coil 14, is provided for the field in the form of a winding surrounding the core 5, between the pole pieces 6, 7.

The armature windings consist of straight coils 15, surrounding the armature cores 10, between the segmental lobes 11, 12.

The armature lobes are shown as riveted at 16, to the inner faces of annular flanges 17, secured to or forming part of sleeves 18. One of these sleeves is shown pinned to the armature shaft at 19, and the other is shown as forced toward the first by nut 20, engaged over a screw-threaded portion of the armature shaft 21.

The armature cores are shown as having reduced end extensions 22, seating in corresponding sockets 23, in the inner faces of the pole segments 11, 12.

The armature coils may be wound directly on the cores 10, and the parts then be assembled by simply pinning the one mounting sleeve on the shaft at 19, engaging the armature cores on the lobes carried by that sleeve and then placing the other sleeve over the shaft, in engagement with the opposite ends of the cores and tightening the parts in this relation by means of the nut 20, or equivalent securing means.

The commutator indicated at 24, may be secured at the outer side of the armature mounting sleeve, and be fixed on the shaft by forcing it over a fluted or knurled portion 25, of the shaft.

The armature segments may be partially surrounded at the inside by molded insulation 26, or the like, and this if desired, may be extended more or less to cover the armature windings. As such insulation merely performs a supporting function, non-ferrous metal may be die cast about the armature lobes and over the inner faces of the supporting plates, or such molded or cast supporting medium may provide the entire support and mounting for the lobes on the shaft, in which event, the inner portions of the material would be formed as the equivalent of the flanged sleeves 18.

The parts may be enclosed within a close fitting two piece molded casing 27, secured together across the dividing line by suitable fastenings 28. The two halves of this molded casing carry the shaft bearings 29, and with the field structure molded therein, support the field and armature in the definitely fixed relation illustrated.

The electrical connections may be as illustrated in Fig. 3, with one commutator brush 30, connected with one side of the source of supply, the other substantially rectilinearly related brush 31, connected at 32, with one end of the field coil, the opposite end of the field coil connected at 33, with the other side of the line and the armature coils 15 each having one end connected at 34, with a commutator segment and the opposite ends having a common connection at 34a, thus producing successive attraction and repulsion of adjoining armature lobes at each pole face.

In this construction, practically all the weight is at the rim of the armature, providing a flywheel effect, assuring smooth quiet running and desirable running torque conditions. The concentrated magnetic flux of the opposed armature lobes and field poles with both attraction and repulsion of two armature lobes at each field pole provides good starting torque. The single field construction and the simple form of easily assembled armature provides a particularly inexpensive structure, which is practical for many uses, such as the running of toys and small machinery.

The machine is adapted for operation as a motor on either direct or alternating current. If intended for the latter, the field poles may be laminated. Also the core may be laminated, as by making it as shown in Fig. 2 in the form of laminations with reduced tongues 35, at the ends of the same forced through corresponding slots in the polar laminations and expanded or in effect riveted as at 36, to firmly unite the parts in such relation.

This machine may be built for a motor with the field magnet at the top, over the armature, as illustrated in Fig. 4.

What is claimed is:

In a machine of the character disclosed, an armature having magnet cores substantially parallel with the armature axis, polar segments on the ends of said magnet cores and projecting straight outward on radial lines and terminating in convex edges concentric to the armature axis, armature windings about said cores wholly in between said polar segments at the ends of said cores, a common connection between the ends of the armature windings at one end of the armature, a commutator having segments connected with the opposite ends of the individual armature windings, a single field magnet comprising a magnet core substantially parallel with the armature axis and pole pieces at the ends of said field magnet core projecting straight inwardly radially of the armature axis and terminating in concave edges concentric to the armature axis and in line with the straight projecting polar segments of the armature magnets, a single field winding on said field magnet core wholly between said straight projecting pole pieces, brushes in engagement with the commutator and electrical connections between said brushes and single field magnet winding.

GEORGE A. GILLEN.